United States Patent [19]

McEnearney

[11] Patent Number: 4,960,260

[45] Date of Patent: Oct. 2, 1990

[54] FLUID RESTRICTING VALVE

[76] Inventor: Paul McEnearney, 53 The Crescent, Dee Why, NSW, Australia, 2099

[21] Appl. No.: 166,600

[22] PCT Filed: Feb. 10, 1987

[86] PCT No.: PCT/AU87/00035
§ 371 Date: Dec. 7, 1987
§ 102(e) Date: Dec. 7, 1987

[87] PCT Pub. No.: WO87/04766
PCT Pub. Date: Aug. 13, 1987

[30] Foreign Application Priority Data

Feb. 10, 1986 [AU] Australia .............................. PH4517

[51] Int. Cl.$^5$ ........................ F16K 47/08; F16K 47/16
[52] U.S. Cl. ..................................... 251/127; 251/118; 138/42; 138/44
[58] Field of Search .................. 251/118, 127; 138/42, 138/44

[56] References Cited

U.S. PATENT DOCUMENTS

| 2,244,311 | 6/1941 | Nee et al. ......................... 251/118 X |
| 2,646,248 | 7/1953 | Cornelius ......................... 251/118 X |
| 3,084,718 | 4/1913 | Ash ................................. 251/118 X |
| 4,335,751 | 6/1982 | Sugimura et al. ................ 138/44 X |

FOREIGN PATENT DOCUMENTS

| 1099815 | 2/1961 | Fed. Rep. of Germany ...... 251/118 |
| 529508 | 6/1955 | Italy ..................................... 251/118 |
| 166542 | 1/1922 | United Kingdom ................ 251/118 |

*Primary Examiner*—Arnold Rosenthal

[57] ABSTRACT

A restrictor is mounted within a passage of a control valve. The restrictor includes an annular disc having openings for the passage of fluid therethrough. The restrictor also includes a conical element coaxial with the annular disc. The restrictor limits the maximum discharge rate of fluid through the passage of the control valve.

6 Claims, 5 Drawing Sheets

FLUID RESTRICTING VALVE

The present invention relates to a system for fluid flow control utilising a restrictor valve which is adapted for insertion near one or more outlet orifices in a fluid supply network thereby enabling control of the discharge of the fluid at the outlet orifice or orifices.

In the past numerous problems have existed in water supply reticulation networks relating to unevenness and irregularity of water flow at outlets in the system. The problems have hitherto previously been evident in small domestic water reticulation systems and also in larger systems where an array of outlets are disposed in series whereby one outlet in the array is proximate to the water source and subsequent outlets in the array are increasingly more distant from the water source. A pressure gradient is normally present along outlets in a series configuration.

This phenomenon of pressure irregularity is common where the array of outlets are vertically separated relative to the water source, such as where an elevated storage tank supplies water by gravity, or where the outlets are substantially horizontally separated from a source such as a mains pressure water storage tank.

The problems of uneven pressure have originated in a number of ways; (ignoring for the purposes of this description distribution pipeline sizes, frictional effects between the water and the pipe wall).

Firstly, when water emanates from a pressurised source whether under gravity or under mechanically generated pressure such as mains pressure and when that water must feed a multiplicity of outlets whether in series or in parallel for the same source pressure, the outlets at the extremity of the supply network, when all or some of the outlets are in operation, suffer a dramatic reduction in pressure as the water attempts to escape through the upstream outlets before reaching the downstream outlets. A variation in pressure at each outlet will occur over the length of the discharge line to which the outlets are connected.

The same phenomenon will occur whether the outlets are disposed substantially horizontally to the supply source or substantially vertically relative to the supply source.

A dramatic reduction can occur where mains pressure must reach substantial heights above the ground. This can occur in home units or multi storey dwellings when outlets are situated on each floor. The outlets on the lower floors tend to deprive the outlets on the upper floors of fluid, creating the uneven pressure distribution.

To a certain extent, especially in showers, the problem is ameliorated by the restricting effect of the conventional shower roseas but it is not regulated to an acceptable level.

Where a water reticulation system has showers which have water mixing fittings there is usually a variation in the pressure between the cold water supply and hot water supply. This can occur if the cold water supply is mains pressure and the hot water supply is gravity fed for instance. It can also occur when losses occur in a mains pressure hot water system.

This results in a build up in the mixing riser of back pressure in the line of highest pressure.

When the flow is restricted at the shower head the higherpressure takes over making the combined mixed flow from the shower head difficult to proPerly control. When there is a drop in hot water pressure the cold water pressure may force the hot water valve cock jumper valve closed or cause a back surge of cold water through the hot water pipe. The reverse occurs if the hot water pressure is the greater.

A further problem that exists in water reticulation systems occurs when opening and closing of valve cocks in the reticulation system causes pressure fluctuations in other outlets in the system. In domestic reticulation systems this phenomenon is noticeable when a person showering may detect a reduction either in temperature or pressure or both, as a result of the activation of another valve cock in the same reticulation system elsewhere in the house.

The present invention seeks to overcome these and other problems by providing a regulated fluid flow system which incorporates a restricting valve for achieving a relatively constant discharge pressure at each orifice or orifices in the system.

It is an advantage of the present invention that substantial savings in water consumption and energy bills can be made when the restricting valve is installed at or near outlets in a reticulation system.

In its broadest form the present invention comprises a system for the regulation of fluid flow at an outlet orifice or orifices in a pipe or pipe network, said system comprising:

a source of fluid supply to a distribution pipe or network of pipes each having an outlet orifice or orifices respectively, a control valve or valves located in said pipe or in each pipe in said network between said source of fluid supply and said orifice or orifices, a restricting valve adapted for insertion into each of said control valve or valves to control the fluid flow and discharge pressure of the fluid therethrough at the said orifice or orifices such that a predetermined maximum discharge pressure is maintained at each of said orifice or orifices but at a pressure below the available maximum fluid supply pressure when said control valve or valves are fully open.

The means for regulating the fluid flow at the outlet orifice or orifices in a reticulation network comprises a restricting valve inserted in a control valve or valves in said network and whose shape and configuration is such that relatively noiseless pressure control is maintained at each orifice.

The insertion of the restricting valves in the network has the effect of causing even pressure distribution at each orifice and almost complete elimination of the pressure gradient which nOrmally occurs when unrestricted outlets are in series from a supply source.

The orifice discharge pressures are, by the insertion of the restricting valve at each orifice in the network set so that they cannot exceed a predetermined maximum and when that maximum is achieved at one discharge orifice, other discharge orifices in series with the first-mentioned orifice do not exceed the predetermined maximum pressure irrespective of the proximity of an orifice in the network relative to the fluid source where the supply pressure is usually highest.

The restrictor is preferably inserted within control valve cocks in the reticulation network and in particular in valve seats in the control valve cocks.

In another form the invention comprises a restricting valve adapted for insertion in a control valve in a fluid supply line or lines to restrict the flow of fluid at an outlet or outlets in said fluid supply line or lines, said restricting valve comprising, a first substantially planar element having at least one hole penetrating therethrough, and a second element interconnected with said first element;

wherein, when the restricting valve is inserted in a fluid supply line the configuration of the restricting valve regulates the discharge rate of the fluid at the outlet orifice such that said discharge rate does not exceed a predetermined maximum valve.

In an alternative form the present invention comprises a fluid flow restricting valve which is adapted to be fitted into the seat portion of a valve cock; said restricting valve comprising a first portion and a second portion connected to each other; said first portion having a stem fixedly attached to a substantially planar annular plate which has a sealing means mounted thereon adapted to engage the seat in the valve cock; the annular Plate having a substantially annular projection extending substantially normally therefrom; the said second portion comprising a valve body attached to the said annular projection, said valve body comprising a columnar projection adapted to fit within the fluid flow passage of the valve cock; wherein when the said valve cock is turned on to allow the passage of fluid therethrough, the action of the fluid on the restrictor valve causes the restrictor valve to travel within the fluid flow passage whereby the columnar projection of the valve body controls the flow of the fluid past the valve body thereby restricting the flow of the fluid such that fluid back pressure is reduced.

In the preferred embodiment of this form of the invention, the restricting valve is made from a brass or plastics material and the first portion of the restrictor valve is comprised of a conventional jumper valve. This conventional valve is modified in such a way that a valve body is fixedly attached to the annular projection of the jumper valve. Preferably, the jumper valve and the valve body comprise two portions of the restrictor valve and are cast or moulded in one piece. Conceivably, however, the two portions could be detachably connected to one another where required.

Preferably, the valve body consists of a substantially annular columnar projection which is proportioned to fit inside a fluid flow passage of a conventional valve cock. The fluid flow Passage is in this instance located within a modified seat housed within the valve cock.

In another from the present invention comprises a valve assembly for restricting and controlling the passage of a fluid in a fluid supply line; said assembly comprising, a spindle adapted for sealing engagement with a valve seat, a restricting valve adapted for insertion in a passage in said valve seat, wherein, when said restrictor is inserted in said valve seat said restricting valve regulates the discharge rate of the fluid at an outlet orifice in the said fluid supply line such that it does not exceed a predetermined maximum valve.

Preferably the valve assembly is adapted for fitting to a conventional valve cock or tap.

The invention will now be described in detail according to a preferred but non limiting embodiment wherein.

Figure 5A:
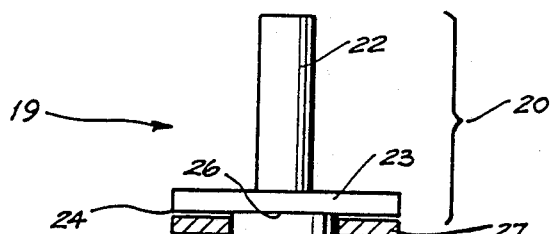
Figure 5B:
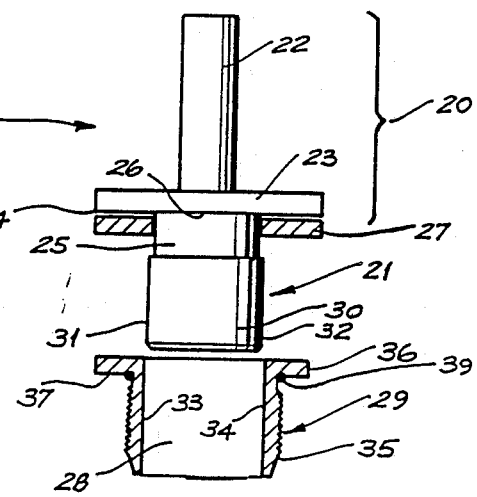
Figure 5C:
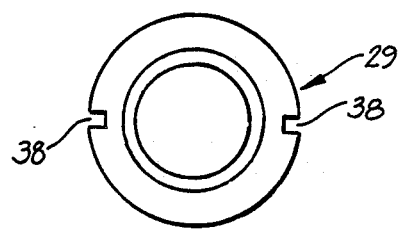
Figure 6:
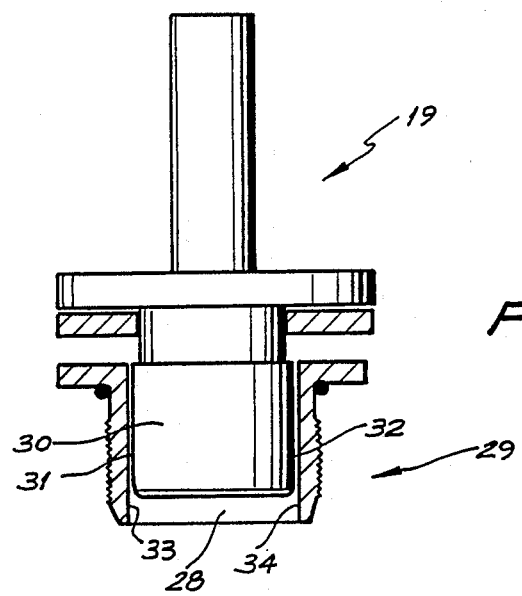
Figure 7:
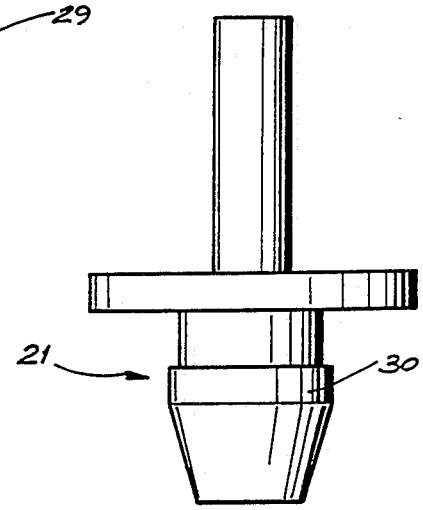
Figure 8:
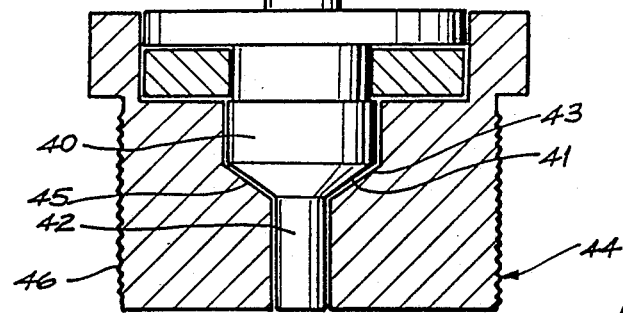
Figure 9A:
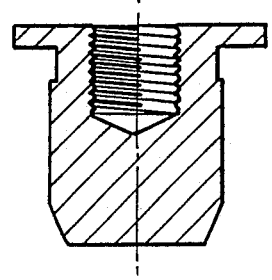
Figure 9B:
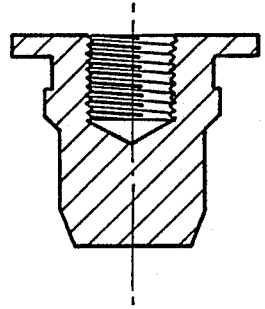
Figure 9C:
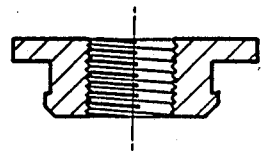
Figure 10:
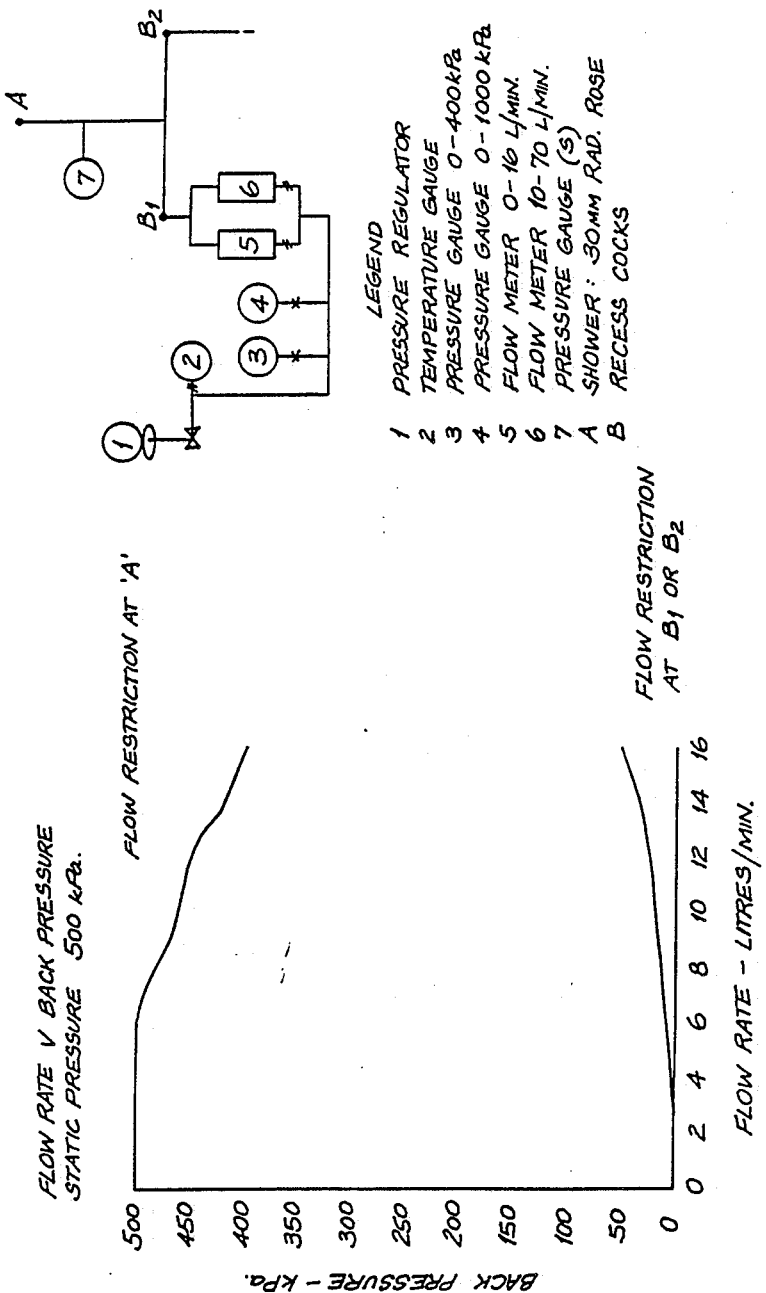

FIGS. 5a, b and c depict a restricting valve according to the alternative of the present invention with accompanying seat;

FIG. 6 shows the restricting valve of FIG. 5 in use within the orifice of a valve cock seat;

FIG. 7 shows an alternative embodiment of the restricting valve of the present invention showing the restricting valve body comprised of a tapered column;

FIG. 8 shows another embodiment of the restricting valve comprising an abbreviated tapered column with an elongated stem, wherein the valve body is located within a seat;

FIG. 9a, b and c shows in an alternative form, restricting valve bodies adapted for detachable connection to a jumper valve according to various embodiments; and FIG. 10 shows graphically the test results from installation of a restricting valve in a single shower network.

Figures 1A, 1B, 1C, 1D:
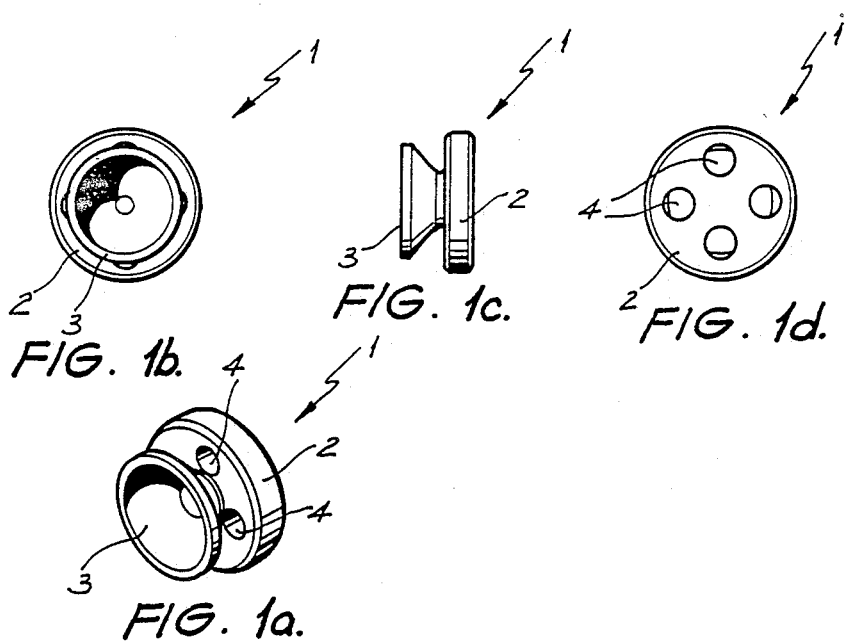
FIG. 1 shows the restricting device according to the preferred embodiment.

Referring to FIG. 1 there is shown a restricting valve 1 according to a preferred embodiment and which is adapted for insertion into a valve cock or cocks located in a fluid flow reticulation network.

The restricting valve 1 comprises an annular disc 2 and a diametrically smaller truncated conical portion 3 which attaches to the disc 2. The annular disc 2 ideally has four holes 4 each of which are of the same diameter. Also, the holes 4 are ideally spaced equidistant from the central axis of the restricting valve. FIG. 1 shows the Preferred restricting valve from a number of different views to enable a full perception of its shape and configuration.

Field tests have shown that the shape and configuration of the restricting valve as depicted in FIG. 1 is functionally efficient.

Figure 2:
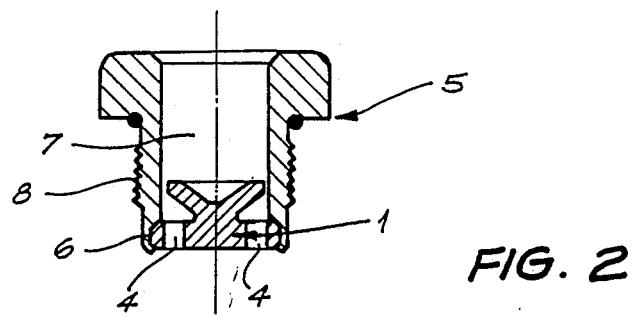
FIG. 2 shows a cross-sectional view of the restricting valve according to FIG. 1 inserted in a valve cock seat.

FIG. 2 shows the restricting valve of FIG. 1 inserted in a valve cock seat 5. The annular disc 2 of the restrictor 1 engages an annular recess 6 at the base of the valve seat 5. When in use, the seat 5 is located in a conventional valve cock which is in turn located in a pipe network preferably in the proximity of a fluid outlet orifice.

The seat 5 is fitted by means of the thread 8 to a conventional tap or similar valve arrangement (not shown).

In use fluid from feed pipes passes axially along the passage 7 via holes 4 in restricting valve 1. The presence of the valve 1 inhibits the flow of the fluid such that irrespective of the supply pressure on the upstream side of the restricting valve the pressure on the downstream side of the restricting valve can be restricted so as not to exceed a predetermined maximum value. This effect is repeated at each outlet irrespective of the number of additional outlets which may be present in the reticulation network. The pressure at each outlet can be made the same according the type of restricting valve which is inserted near an outlet. It can also be varied by changing the configuration of the valve at different outlets according to requirements.

Figure 3:
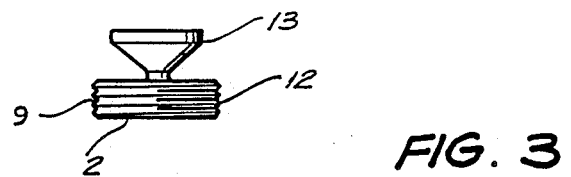
FIG. 3 shows the restricting valve according to an alternative configuration adapted for threadable engagement with the valve seat of a valve cock.
Figure 4:
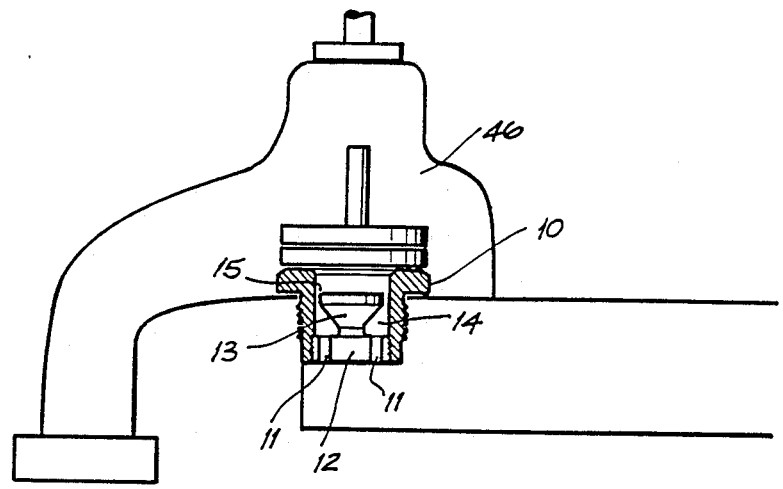
FIG. 4 shows the restricting valve according to FIG. 2 inserted in a valve cock seat which is adapted for threadable insertion into a valve cock assembly.

FIG. 3 shows the restricting valve according to an alternative embodiment wherein the annular disc 2 is adapted with a thread 9 for threadable insertion into a valve seat 10 as shown in FIG. 4. In the embodiment of FIG. 4 the valve seat 10 is shown threadably adapted to a conventional valve cock 46.

In operation this restricting valve can be screwed into the threaded base of the valve seat 10. Fluid passes through the holes 11 in the annular disc 12 of the restricting valve and then passes between the cone 13 and the inner wall of the valve seat 10 via passage 14. The holes 11 act to restrict fluid flow and cause a consequent decrease in pressure on the downstream side of the restricting valve.

At a given flow rate there is a decrease in pressure between the holes 11 and the portion of the fluid flow passage designated with numeral 15.

At position 15 the velocity of the fluid is reduced.

Referring to FIG. 5 there is shown a restricting valve 19 according to a preferred embodiment comprising a first portion and a second portion. The first portion is similar to and comprises a conventional jumper valve 20. The second portion is essentially comprised of a valve body 21.

The jumper valve according to conventional design is comprised of an elongated stem 22 which is adapted to fit inside an axial passage of a valve cock spindle (not shown). The stem 22 is fixedly connected to an annular disc 23. The disc 23 has a flat annular under surface 24 and is concentric with an annular protrusion 25. Protrusion 25 is fixedly attached to the surface 26 of disc 23. Detachably abutting to surface 26 is annular sealing washer 27.

Annular sealing washer 27 has an orifice 27 at its middle which forms an inner circle through which protrusion 25 passes. The washer 27 is held in position largely by the friction imparted by the close fit between the protrusion 25 and the inner circle periphery of the washer 27. With the stem 22 being guided in the axial passage of the spindle the washer 27 can then sit on the seat 29 of the valve cock (not shown) in correct alignment. When the valve cock is closed the compressive force on the jumper valve squeezes the washer 27 between the disc 23 and the seat 29 thereby preventing the passage of fluid through the valve cock.

The present invention according to this embodiment does not change the operation of the jumper valve 20 inasmuch as it acts in sealing the fluid supply orifice in the typical valve cock.

The present invention according to one embodiment incorporates in one unit a jumper valve and a valve body wherein the jumper valve with the assistance of washer 27 acts to cut off the fluid supply and the valve body 21 acts to restrict the flow of fluid thereby controlling the delivery pressure of the water at the outlet of a valve cock.

The restricting valve body 21 is joined with the jumper valve 20 by means of the protrusion 25.

Extending axially from and connected to the protrusion 25 is an elongated annular column 30 (see FIG. 6) which is proportioned to fit within the orifice 28 of seat 29.

Where necessary, existing valve cocks can have their seats modified to threadably receive a substitute seat (such as that shown in FIG. 8) specially proportioned to receive the columnar member 30.

The columnor member 30 is proportioned to a diameter to ensure a close fit between its walls 31 and 32 and the inner walls 33 and 34 respectively of the valve seat 29.

The clearance between the walls 31 and 33 and 32 and 34 respectively is designed to decrease the velocity of the water as it flows from the source upstream of the restricting valve to its destination downstream of the restrictor valve.

When a conventional valve cock is to be modified by the insertion of the restricting valve according to this embodiment of the invention, the conventional seat in the valve cock body must be altered to receive the restricting valve body. Firstly, the existing hole in the valve cock must be threaded by cOnventional means to provide for the threadable insertion of the restricting valve seat 29.

The seat 29 is comprised of a cylindrical main body 35 with a passage 28 extending therethrough.

Attached to the upper portion of cylindrical body 35 is an annular flange 36. The engagement of the flange 36 and cylindrical body 35 form a shoulder 37 which engages the seat surface of the existing seat in the valve cock (not shown).

The slots 38 provide a means for a tightening tool to screw the seat 29 into position.

Once the seat 29 is in position 'O' ring 39 provides a seal between the seat and the valve body.

The restricting valve can then be inserted into the orifice 28 of the seat 29.

FIG. 6 shows the restrictor in use as incorporated with the seat.

The columnar member 30 fits snugly in orifice 28. Member 30 by its shear volume severely restricts the velocity of the fluid flow through the orifice due to the decrease in the orifice cross sectional area. The fluid can only pass between the walls 31 and 33 and 32 and 34.

In order to maintain the restriction to the flow, it is essential that at least some part of walls 31 and 32 are opposing walls 33 and 34 within passage 28. If the columnar member 21 were to depart axially from orifice 28 the restricting effect would be reduced.

FIG. 7 shows an alternative embodiment of the invention showing the columnar member 30 of the valve body 21 tapered inwardly towards its central axis.

FIG. 8 shows another embodiment of the restricting valve showing the columnar member abbreviated.

In this embodiment the jumper valve is shown according to the conventional design with the restricting valve body comprising an abbreviated annular column member 40 with an inward taper 41.

The taper 41 ends at an elongated stem 42. This restricting valve fits inside a complementary orifice arrangement 43 within valve seat 44.

The valve seat 44 in this embodiment is fitted by means of threaded portion 46 to the existing seat (not shown) in a conventional valve cock assembly.

The tapered surface 41 abuts the opposing surface 45 which provides a seating surface.

It has been found in tests that the various shapes and configurations of the restricting valve bodies do impart different performance characteristics.

Experiment has shown that the optimum shapes resemble those shown in FIGS. 1 and 5.

As an alternative to providing a restricting valve moulded in one unit, the valve can be composed of a detachable two part member having the jumper valve portion adapted to threadably receive the restricting valve body portion.

FIGS. 9a, b and c shows three alternative valve bodies adapted to threadably engage with the protrusion 25 of a jumper valve. For convenience, the valve body can be detached from the jumper valve when no restriction of fluid flow is required.

The restricting valve of the present invention has been successfully tested and used to restrict flow in several fitments in series and also to restrict flow and eliminate undesirable back pressure in conventional fluid mixer fittings.

Where the discharge rate of fluid through the valve cocks in a water system is in excess of the required flow rate, this causes a distinct pressure drop across the system especially during peak periods when several fitments are in and out of use.

FIG. 10 depicts graphically the test results from experimental insertion of a restricting valve in a shower mixer system comprising one outlet.

The graPh shows the dramatic decrease in back pressure for an increase in flow rate.

As can be seen from the graph, the installation of the restricting valve of the present invention results in the almost complete elimination of back pressure in the mixing riser which would occur in the riser otherwise.

Another advantage of the restricting valve is that it enables a set maximum volume of mixed water to flow through the outlet. The amount of flow can be regulated when a flow is desired below the maximum volume.

Known restricting devices such as those which are placed at the outlet on a shower fitting, for instance, do not allow controlled adjustment of the flow especially when control valve cocks nearest the fluid supply are fully open.

The portion of the graph designated A indicates the effect of a restriction caused by a shower head.

The portion marked B indicates the dramatically decreased back pressure with the installation of a restricting valve in the valve cock body according to the present invention.

The valves have been tested on multiple series shower fittings with the result being that there is a decrease in back pressure in each mixer fitting.

Also, the pressure gradient across the series of showers is shown to be dramatically decreased.

When the valves are installed in hot water valve cocks the result is that a constant predetermined flow of hot water can be achieved thus resulting in considerable energy cost savings. This is balanced by a variable flow of cold water through the valve cocks.

Thus, in one application, the valve effectively places a governor on hot water usage, which tests have shown, results in these considerable energy cost savings.

Field tests have shown that when a series of restricting valves are installed in a water reticulation network water savings of at least 22% have been recorded and savings of at least 28% have been recorded for energy usage after variables have been taken into account such as temperature of the water and number of people using the system at any particular time.

In the fluid control system with restrictors installed near various outlets a fluid and energy saving is made as each outlet is restricted to a maximum pressure and flow rate which is below the delivery pressure in the lines which feed to the various orifices.

A relatively constant pressure and temperature is therefore maintained at each outlet when other taps are turned on. Furthermore, back pressure at the taps or valve cocks is eliminated due to the control of the volume of fluid at mixing sets.

It has been found that performance characteristics vary according to the particular shape and configuration of the restricting valves installed in a network.

The following results were achieved using three different restrictors each of different diameters.

| STATIC PRESSURE KPa | FLOW RATE | PRESSURE IN RESTRICTOR REGION |
| --- | --- | --- |
| 600 | 3 L/M | 530 |
| 600 | 4.25 L/M | 420 |
| 600 | 6.5 L/M | 180 |

It will be obvious to persons skilled in the art that numerous variations and modifications can be made to the invention as broadly described herein without departing from the overall spirit and scope of the invention.

What is claimed is:

1. A fluid supply system comprising:
    a source of pressurized fluid;
    a control valve having an outlet, an inlet, a valve seat between the outlet and the inlet, and a through passage between the inlet and the valve seat;
    piping means for fluidly coupling the outlet of the control valve to the source of pressurized fluid; and
    a restrictor adapted for insertion in the through passage in the control valve, said restrictor comprising:
        an annular disc, mounted within the through passage, having openings therethrough for the passage of a fluid through said openings; and
        a conical element interconnected with or integral with said annular disc, the central axis of said conical element and the central axis of said disc being in alignment;
    wherein the restrictor regulates the discharge rate of the fluid through the restrictor such that said discharge rate does not exceed a predetermined maximum discharge rate through said restrictor, said maximum discharge rate being below the available maximum discharge rate through the control valve when said control valve is fully open and free of said restrictor.

2. A system according to claim 1 wherein the largest diameter of the said conical element is smaller than the diameter of the said annular disc, said conical portion being adapted to allow passage of fluid about its periphery and between the said periphery and an inner wall of the through passage of said control valve.

3. A system according to claim 1 wherein the said conical element includes a conical recess.

4. A system according to claim 1 wherein the annular disc is adapted with chamfered circumferential edges to enable fitting within the through passage in said control valve.

5. A system according to claim 1 wherein the restrictor is adapted to be threadably inserted into said valve seat.

6. A system according to claim 1 wherein the restrictor is adapted to be slidably inserted into a passage in said valve seat.

* * * * *